United States Patent
Hwang et al.

(10) Patent No.: US 9,386,533 B2
(45) Date of Patent: Jul. 5, 2016

(54) SIGNAL TRANSMISSION METHOD AND APPARATUS OF MULTI-ANTENNA BASE STATION

(71) Applicant: Samsung Electronics Co., Ltd., Gyeonggi-do (KR)

(72) Inventors: Keunchul Hwang, Gyeonggi-do (KR); Heewon Kang, Gyeonggi-do (KR); Wonkyun Suk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 142 days.

(21) Appl. No.: 13/750,578

(22) Filed: Jan. 25, 2013

(65) Prior Publication Data

US 2013/0196605 A1    Aug. 1, 2013

(30) Foreign Application Priority Data

Jan. 26, 2012    (KR) .................. 10-2012-0007929

(51) Int. Cl.
*H04W 52/18*    (2009.01)
*H04W 52/32*    (2009.01)
*H04W 52/42*    (2009.01)

(52) U.S. Cl.
CPC ............ *H04W 52/18* (2013.01); *H04W 52/322* (2013.01); *H04W 52/42* (2013.01)

(58) Field of Classification Search
CPC .... H04W 52/18; H04W 52/322; H04W 52/42
USPC ............. 455/562.1, 67.16, 67.14, 67.11
See application file for complete search history.

(56) References Cited

U.S. PATENT DOCUMENTS

| | | | |
|---|---|---|---|
| 2003/0069022 A1* | 4/2003 | Kintis et al. .................. | 455/452 |
| 2003/0100324 A1* | 5/2003 | Kasapi ................. | H04B 7/0615 455/504 |
| 2004/0229588 A1* | 11/2004 | Cho ........................... | 455/278.1 |
| 2004/0235512 A1* | 11/2004 | Kiiski et al. .................. | 455/522 |
| 2009/0185650 A1* | 7/2009 | Ravid ................... | H04B 7/0617 375/376 |
| 2010/0074241 A1* | 3/2010 | Papageorgiou et al. ...... | 370/342 |
| 2010/0317384 A1* | 12/2010 | Sakai ........................... | 455/501 |
| 2011/0149778 A1* | 6/2011 | Yu ................................ | 370/252 |

* cited by examiner

*Primary Examiner* — Yuwen Pan
*Assistant Examiner* — Fatuma Sherif
(74) *Attorney, Agent, or Firm* — The Farrell Law Firm, P.C.

(57) ABSTRACT

A signal transmission method and apparatus of a base station is provided for increasing transmit power by compensating a phase value of the signal transmitted through multiple antennas based on signal reception status information fed back from a terminal in a wireless communication system. The signal transmission method includes transmitting a signal to at least one terminal through the multiple antennas; receiving signal reception status information transmitted by the at least one terminal; calculating a compensation phase based on the signal reception status information; applying the compensation phase to next signal to be transmitted through the multiple antennas; and transmitting the next signal to the at least one terminal through the multiple antennas.

11 Claims, 6 Drawing Sheets

FIG. 6
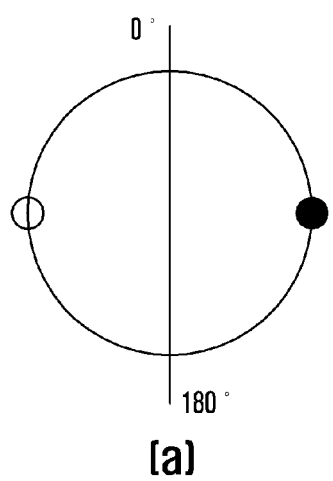
[a]
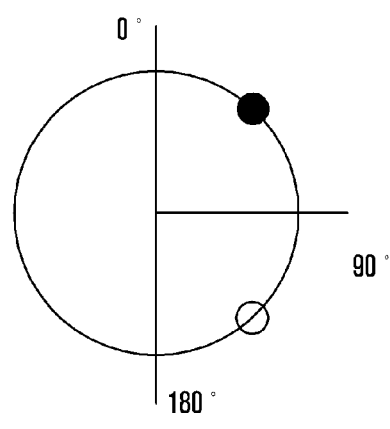
[b]
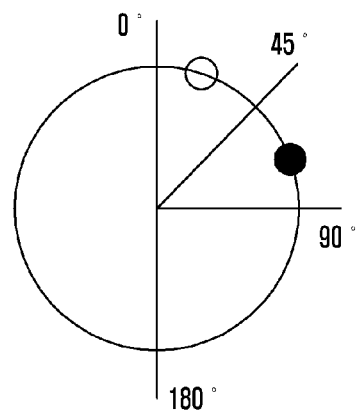
[c]
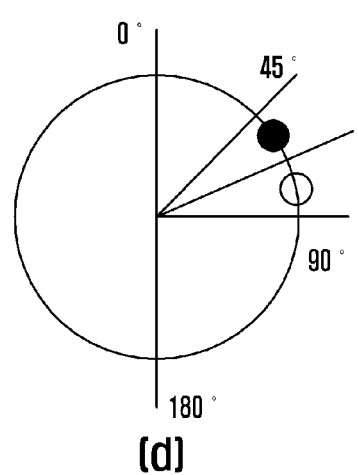
[d]

SIGNAL TRANSMISSION METHOD AND APPARATUS OF MULTI-ANTENNA BASE STATION

PRIORITY

This application claims priority under 35 U.S.C. §119(a) to a Korean patent application filed on Jan. 26, 2012 in the Korean Intellectual Property Office and assigned Serial No. 10-2012-0007929, the entire disclosure of which is hereby incorporated by reference.

BACKGROUND OF THE INVENTION

1. Field of the Invention

The present invention relates to Global System for Mobile Communications (GSM) systems and, in particular, to a signal transmission method and apparatus of a base station for increasing transmit power by compensating phase value of the signal transmitted through multiple antennas based on signal reception status information fed back from a terminal in the GSM system.

2. Description of the Related Art

In radio communication systems, multiple antennas may be used in various transmission techniques such as beamforming with multiple transmit antennas, receive diversity with multiple receive antennas, and transmit diversity with multiple transmit antennas, for improvement in coverage range, capacity, and/or reliability. The transmit diversity techniques can be classified into Space-Time Block Code (STBC) and Transmit Delay Diversity (TDD) techniques. Typically, the GSM system adopts the TDD technique with the configuration as depicted in FIG. 1 to expand the coverage.

FIG. 1 is a block diagram illustrating the configuration of a base station transceiver of a conventional GSM system with TDD.

Referring to FIG. 1, the base station transceiver includes a first antenna 10, a second antenna 12, a first power amplifier 14, a second power amplifier 16, and a delay 18.

The first and second antennas 10 and 12 are capable of transmitting base station signals to a terminal and receiving signals transmitted by the terminal. The first and second power amplifiers 14 and 16 supply power to the first and second antennas 10 and 12, respectively. The delay 18 is capable of being set to a value for delaying the signal to be transmitted through the second antenna 12. In the conventional GSM system, it is possible to increase the transmit power with multiple transmit antennas but no coherent combining among multiple signals, and thus it is difficult to expect 100% of multiple antenna gain.

There is therefore a need for a method for improving coherent combining gain in the GSM system.

SUMMARY OF THE INVENTION

The present invention has been made in an effort to solve the above problems, and it is an aspect of the present invention to provide a signal transmission method and apparatus of a multi-antenna base station that is capable of coherent combining of the transmit signals based on the received signal status information fed back by a terminal in the GSM system.

In accordance with an aspect of the present invention, a signal transmission method of a base station having multiple antennas includes transmitting a signal to at least one terminal through the multiple antennas; receiving signal reception status information transmitted by the at least one terminal; calculating a compensation phase based on the signal reception status information; applying the compensation phase to a next signal to be transmitted through the multiple antennas; and transmitting the next signal to the at least one terminal through the multiple antennas.

In accordance with another aspect of the present invention, a base station apparatus includes an antenna array including multiple antennas for transmitting a signal to at least one terminal, a phase calculator which calculates a phase compensation value based on signal reception status information transmitted by the at least one terminal; and a phase compensator which reflects the phase compensation value to the signal to be transmitted through the multiple antennas.

BRIEF DESCRIPTION OF THE DRAWINGS

The above and other aspects, features, and advantages of certain embodiments of the present invention will be more apparent from the following description taken in conjunction with the accompanying drawings, in which:

FIG. 6 is a diagram illustrating the principle of determining the phase compensation value in the signal transmission method according to an embodiment of the present invention.

DETAILED DESCRIPTION OF EMBODIMENTS OF THE PRESENT INVENTION

Figure 1:
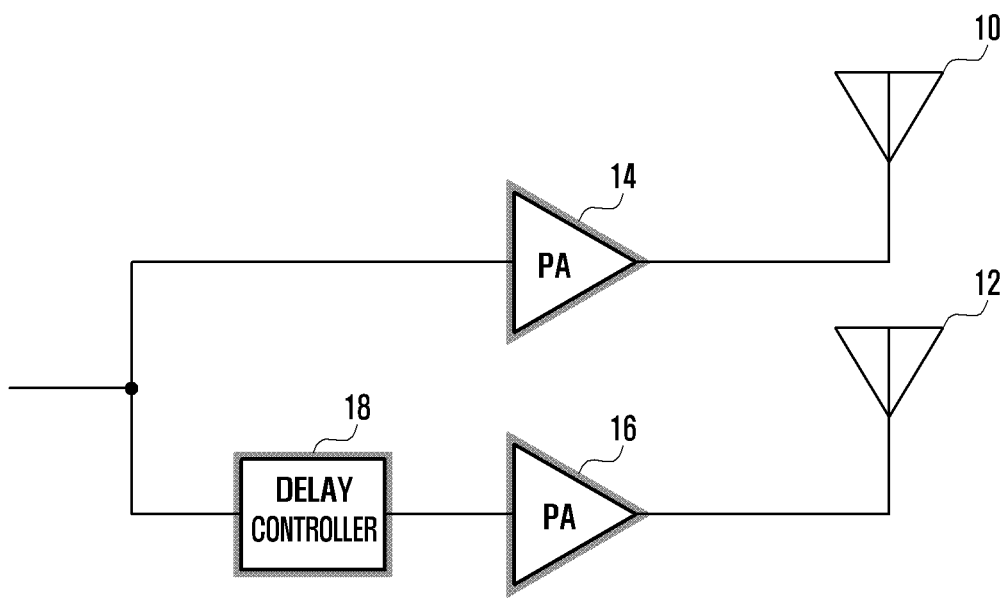
FIG. 1 is a block diagram illustrating the configuration of a base station transceiver of a conventional GSM system with TDD.

Embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Advantages and features of the present invention and methods of accomplishing the same may be understood more readily by reference to the following detailed description of embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Furthermore, the respective block diagrams may illustrate parts of modules, segments or codes including at least one or more executable instructions for performing specific logic function(s). Moreover, it should be noted that the functions of the blocks may be performed in a different order in several modifications. For example, two successive blocks may be performed at substantially the same time, or may be performed in reverse order according to their functions.

Figure 2:
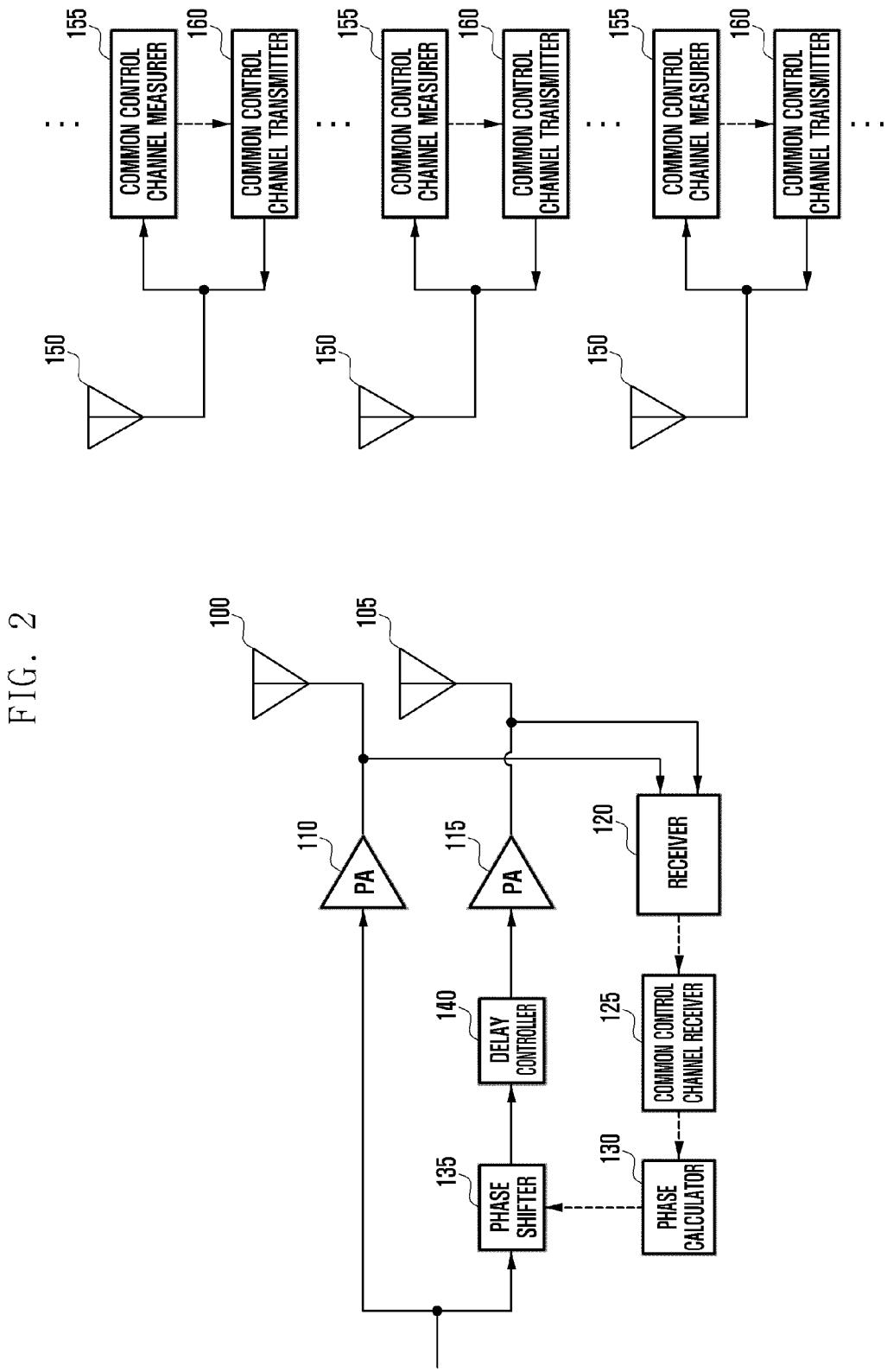
FIG. 2 is a diagram illustrating the configurations of a base station transceiver and multiple terminals' transceivers for communication through a common control channel in a GSM system according to an embodiment of the present invention.

FIG. 2 is a diagram illustrating the configurations of a base station transceiver and multiple terminals' transceivers for communication through a common control channel in a GSM system according to an embodiment of the present invention.

As shown in FIG. 2, the base station includes an antenna array composed of a first antenna 100 and a second antenna 105. The antenna array is capable of including two or more antennas.

The base station is capable of establishing connection with at least one terminal. Since the signals are communicated through a common control channel, a phase compensation value is determined based on the values of received signal status informations transmitted by respective terminals. The compensation phase determination method is described later below.

The antenna array is also capable of further including a first amplifier 110 and a second amplifier 115 for amplifying the same input signal to be transmitted through the first and second antennas 100 and 105.

The signal to be transmitted is input to the first antenna 100 directly and the second antenna 105 via a phase shifter 135 for compensating the phase value of the signal and a delay controller 140 for adjusting the delay value. By compensating the phase value and the delay value of the signal in the above way, it is possible to increase the transmit power and thus the coverage of the base station. The operation of the phase shifter 135 is described later below.

The signal transmitted through the antennas 100 and 105 are received by the transceiver 150 of each terminal. The common control channel measurer 155 of each terminal checks the information carried in the signal received by the transceiver 150 and measures the signal strength. According to an embodiment of the present invention, the common control channel measurer 155 calculates at least one of signal level and signal quality of the signal received by the transceiver 150 through the common control channel.

The signal level and signal quality values can be changed according to the strength of the signal transmitted by the base station; and the greater the values are, the better the communication quality in the same environment. Accordingly, in order to improve the signal level and signal quality, it is preferred for the base station to perform coherent combining for changing the phase compensation value.

The signal including the signal level or signal quality value measured by the common control channel measurer 155 is transferred to the transceiver 150 through the common control channel transmitter 160, and the transceiver 150 transfers the signal to the antennas 100 and 105 of the base station.

The response signal transmitted by the terminal is received through the antennas 100 and 105 and then transferred to the receiver 120. The receiver 120 generates the data necessary for use in checking the receive signal status of the terminal to the common control channel receiver 125.

The common control channel receiver 125 checks the signal level and signal quality values from the data provided by the receiver 120.

The phase calculator 130 stores the signal level and signal quality values received from the common control channel receiver 125 and compares the newly received signal level and quality values with the previously stored signal level and quality values. The phase calculator 130 determines the phase compensation value in the course of improving at least one of the signal level and signal quality values based on the comparison result. However, the manner in which the phase calculator 130 determines the appropriate phase compensation value is described later.

The phase shifter 135 applies the phase compensation value calculated by the phase calculator 130 to the signal to be transmitted through the second antenna 105.

By compensating the phase value of the signal to be transmitted based on the signal quality or signal level value transmitted by the terminal, it is possible to increase the transmit power. As a consequence, it is expected that the coverage of the base station can be expanded.

In the following, a description is made of the method for calculating the phase compensation value for expanding the transmission coverage on a Broadcast Control CHannel (BCCH) as a common control channel. BCCH is characterized in that it is transmitted at the maximum transmit power without transmit power control. Each of the terminals connected to the base station that have received the BCCH feeds back the signal level or signal quality value to the base station at a period of 480 msec.

The signal transmitted through two transmit antennas of the base station can be expressed by Equation (1):

$$s_{BCCH\_1}(t) = x(t) \cdot e^{j2\pi f_c t}$$
$$s_{BCCH\_2}(t) = x(t-\tau) \cdot e^{j\theta_{BCCH}} \cdot e^{j2\pi f_c t}$$

where $s_{BCCH\_1}(t)$ denotes the signal transmitted through the first transmit antenna 100, $s_{BCCH\_2}(t)$ denotes the signal transmitted through the second transmit antenna 105, x(t) denotes the GSM base-band transmit signal, τ denotes a delay value of the signal transmitted through the second transmit antenna 105 for transmit delay diversity, and $\theta_{BCCH}$ denotes the phase compensation value of the signal transmitted through the second transmit antenna 105 for expanding the coverage, as a main object of the present invention.

The phase calculator 130 checks at least one of the signal level and signal quality values reported by the terminal and compares the newly received value with the previously stored value to determine whether the signal level or signal quality has increased and to apply a new phase compensation value based on the determination result.

In transmitting the signal on the common control channel, the phase calculator determines a compensation phase maximizing the sum of the signal level or signal quality values reported by the terminals connected to the base station to expand the transmit coverage.

Figure 3:
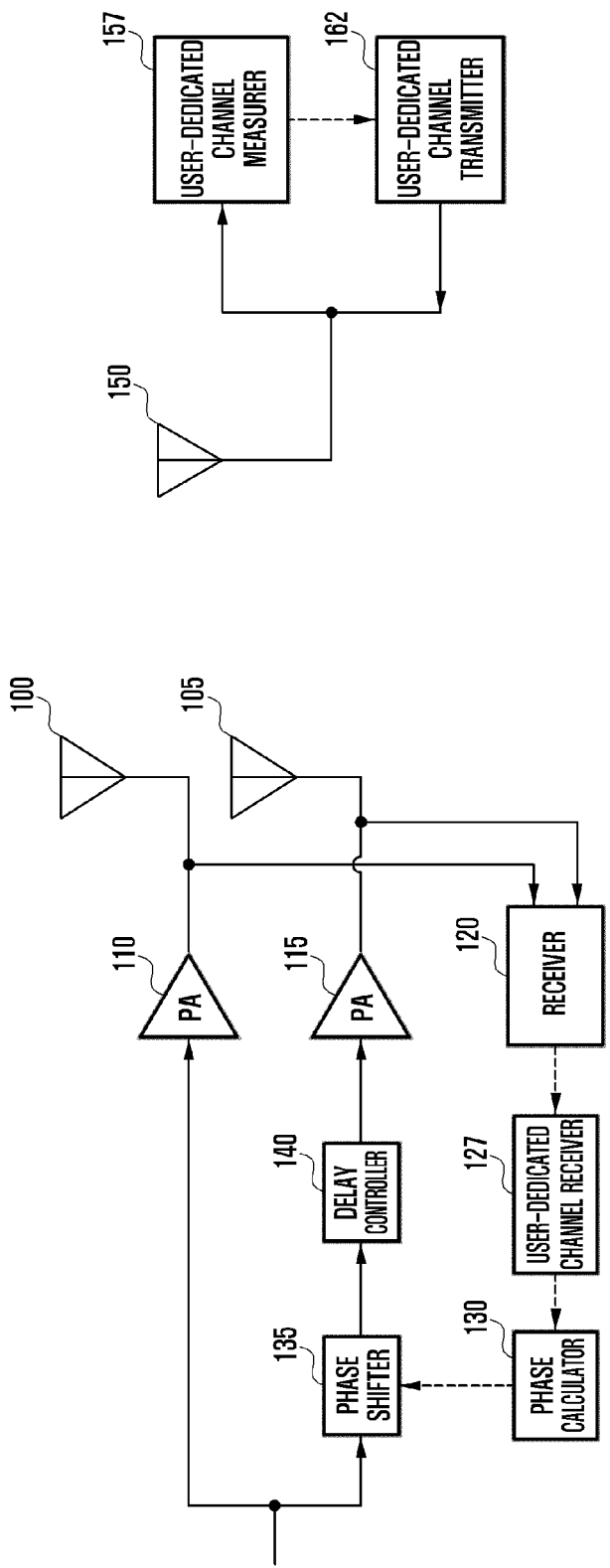
FIG. 3 is a diagram illustrating the configurations of a base station transceiver with multiple antennas and a terminal transceiver with a signal antenna for communication through a user-dedicated channel for the signal transmission method according to an embodiment of the present invention.

FIG. 3 is a diagram illustrating the configurations of a base station transceiver with multiple antennas and a terminal transceiver with a signal antenna for communication through a user-dedicated channel for the signal transmission method according to an embodiment of the present invention.

The configurations of the base station and terminal transceivers are similar to those of FIG. 2. However, at least some part of the base station and terminal transceiver can be configured differently according to a change in the channel for transmitting signals.

The base station includes a first antenna 100 and a second antenna 105 for transmitting and receiving signals. The antenna array is capable of including two or more antennas according to an embodiment of the present invention.

The base station further includes a first power amplifier 110 and a second power amplifier 115 for amplifying the same signal to be transmitted through the first and second antennas 100 and 105.

The signal to be transmitted is input to the first antenna 100 directly and the second antenna 105 via a phase shifter 135 for compensating the phase value of the signal and a delay controller 140 for adjusting the delay value. By compensating the phase value and the delay value of the signal in the above way, it is possible to increase the transmit power and thus the coverage of the base station. The operation of the phase shifter 135 is described later below.

The signal transmitted through the antennas 100 and 105 is received by the transceiver 150 of the terminal. A user-dedicated channel measurer 157 of the terminal checks the information carried in the signal received by the transceiver 150 and measures the signal strength. According to an embodiment of the present invention, the user-dedicated channel measurer 157 calculates at least one of mean bit error or variation coefficient of bit error of the signal received by the transceiver 150 through the user-dedicated channel.

The lower the mean bit error or variation coefficient of bit error is, the better the transmission efficiency is. Accordingly, it is preferred for the base station to perform coherent combining in the course of decreasing the mean bit error or variation coefficient of bit error.

The signal including the mean bit error or variation coefficient of bit error calculated by the user-dedicated channel measurer 157 is transferred to the transceiver 150 through the user-dedicated channel transmitter 162. The transceiver 150 transfers the signal to the antennas 100 and 105 of the base station.

The response signal transmitted by the terminal is received through the antennas 100 and 105 and then transferred to the receiver 120. The receiver 120 generates the data necessary for use in checking the receive signal status on the user-dedicated channel to the user-dedicated channel receiver 127.

The user-dedicated channel receiver 127 stores the bit error and variation coefficient of bit error reported by the terminal. The user-dedicated channel receiver 127 also compares the newly received bit error and variation coefficient of bit error with the previously stored bit error and variation coefficient of bit error.

According to an embodiment of the present invention, the user-dedicated channel receiver 127 is arranged in parallel with the common control channel receiver 125 depicted in FIG. 2.

The common control channel receiver 125 receives the signal level and signal quality values in the transmit signal.

The phase calculator 130 stores the signal level and signal quality values received from the user-dedicated channel receiver 127 and compares the newly received signal level and quality values with the previously stored signal level and quality values. The phase calculator 130 determines the phase compensation value in the course of improving at least one of the signal level and signal quality values based on the comparison result. The phase calculator 130 operates in a manner similar to that of FIG. 2 in determining the appropriate phase value. However, the phase calculator 130 determines the phase compensation value in the course of decreasing the mean bit error and variation coefficient of bit error because of the use of the user-dedicated channel.

Figure 4:
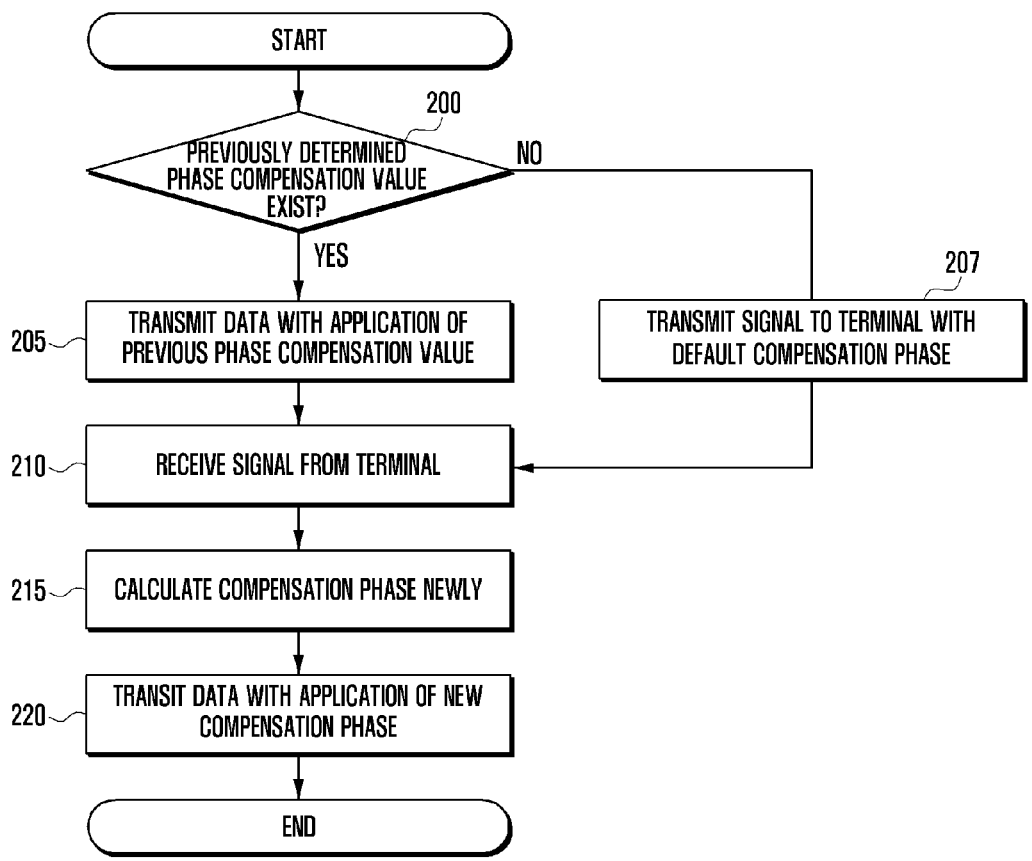
FIG. 4 is a flowchart illustrating the compensation phase procedure of the signal transmission method according to an embodiment of the present invention.

According to an embodiment of the present invention, the base station and terminal of FIG. 4 are capable of communicating signals through a slow associated control channel.

FIG. 4 is a flowchart illustrating the compensation phase procedure of the signal transmission method according to an embodiment of the present invention.

The phase calculator 130 determines at step 200 whether a previously calculated phase compensation value exists.

If there is the previously calculated phase compensation value, the phase calculator applies the phase compensation value to the signal to be transmitted to the terminal at step 205.

If it is the initial transmission from the base station to the terminal, there is no data to be used for calculating the phase compensation value. In this case, the phase calculator applies a default phase compensation value to the signal at step 207. The default phase compensation value can be set by the user and preferably set to 0°.

The base station receives a response signal including signal reception status reported by the terminal at step 210. The reception status may have a different value according to the transmission channel. For example, the reception status information includes at least one of signal level, signal quality, mean bit error, and variation coefficient of bit error.

At step 215, the new phase compensation value can be calculated in the course of increasing the signal level and signal quality, and during decreasing the mean bit error and variation coefficient of bit error. That is, the base station analyzes the reception status value included in the response signal and selects the phase compensation value to improve the reception status.

The base station applies the newly calculated phase compensation value to the signal to be transmitted at step 220.

Through repetitive response signal analysis, it is possible to determine the appropriate phase compensation value inductively. The base station performs the coherent combining with the phase compensation value so as to increase the power of the signal to be transmitted. With the improvement of the transmit power, the coverage of the base station is expanded.

Figure 5:
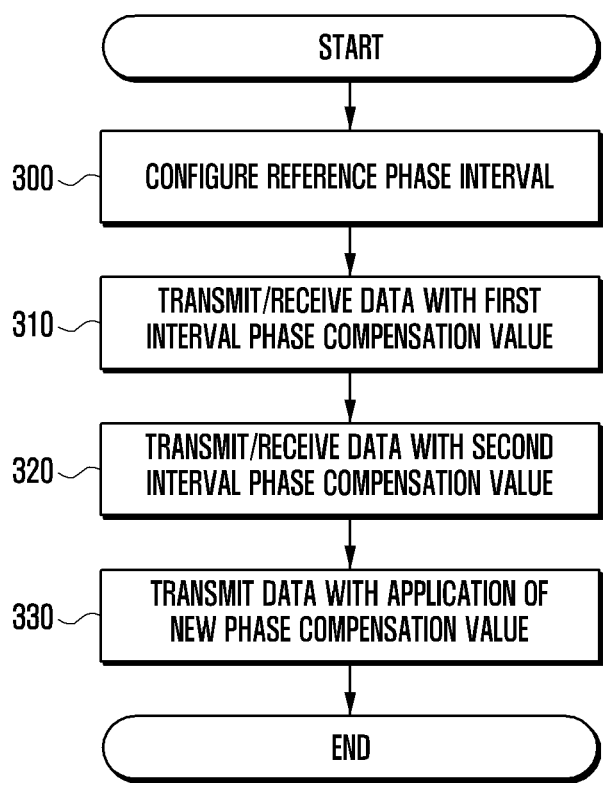
FIG. 5 is a flowchart illustrating the phase compensation value determination result of the signal transmission method according to an embodiment of the present invention.

FIG. 5 is a flowchart illustrating the phase compensation value determination result of the signal transmission method according to an embodiment of the present invention.

The phase calculator 130 calculates the phase compensation value based on the reception status included in the response signal transmitted by the terminal. The value indicating the reception status can be any of a signal level, signal quality, mean bit error, and variation coefficient of bit error.

The phase calculator 130 determines the phase compensation value in the course of increasing the signal level and signal quality. The phase calculator 130 also determines the phase compensation value in the course of decreasing the mean bit error and variation coefficient of bit error.

The phase calculator configures the reference phase interval at step 300. The reference phase interval is the range for determining the phase compensation value and configured in the range between 0° to 360°. The reference phase interval is configured based on the response signal received previously. The reference phase interval can be divided into a first half phase interval and a second half phase interval. Basically, the reference phase interval can be set to the entire range from 0° to 360° for the initial transmission of the signal. The reference phase interval can be adjusted in the course of improving the signal reception status by repeatedly applying the phase compensation value to the signal.

The base station transmits the signal to which a first phase interval compensation value is applied to the terminal and receives a response signal from the terminal at step 310. The base station records the reception status value included in the received response signal. Assuming initial transmission, the first phase interval has the range of 0° to 180°, and the data is transmitted with the 90° as the central value of the first phase interval.

The base station transmits the signal to which a second phase interval compensation value is applied to the terminal and receives a response signal from the terminal at step 320.

The base station records the reception status value included in the received response signal. Assuming initial transmission, the second phase interval has the range of 180° to 360°, and the data is transmitted with 270° as the central value of the second phase interval.

The phase calculator compares the transmission statuses of the signals transmitted with the application of the first phase interval compensation value and the second phase interval compensation value with each other, selects and transmits the phase compensation value having the better transmission status at step 330.

After selecting the phase compensation value for better reception status, the base station repeats steps 300 to 330. In this case, the new reference phase interval can be one of the first and second half phase intervals close to the phase having the better reception status. If the reception status is better with the phase compensation value of 90°, the next reference phase interval becomes the range of 0° to 180°.

FIG. 6 is a diagram illustrating the principle of determining the phase compensation value in the signal transmission method according to an embodiment of the present invention.

Referring to FIG. 6, the black dot on the circumference of a circle indicates the phase for better reception status.

In part (a) of FIG. 6, the first phase interval corresponds to the range of 0° to 180°, and the second phase interval corresponds to the range of 180° to 360°. The phase calculator 130 sets the first phase interval compensation value to 90° and the second phase interval compensation value to 270°. The base station transmits the signal to which the phase compensation value is applied to the corresponding terminal and receives the response signal from the terminal. According to an embodiment of the present invention, it is determined that the reception status is better when the first phase interval compensation value is applied.

Based on the determination result in part (a) of FIG. 6, the first phase interval corresponds to the range of 0° to 90° and the second phase interval to the range of 90° to 180° as shown in part (b) of FIG. 6. The phase calculator 130 sets the first phase interval compensation value to 45° and the second phase interval compensation value to 135°. The base station transmits the signal to which the phase compensation value is applied to the corresponding terminal and receives the response signal from the terminal. According to an embodiment of the present invention, it is determined that the reception status is better when the first phase interval compensation value is applied.

Based on the determination result in part (b) of FIG. 6, the first phase interval corresponds to the range of 0° to 45° and the second phase interval to the range of 45° to 90° as shown in part (c) of FIG. 6. The phase calculator 130 sets the first phase interval compensation value to 22.5° and the second phase interval compensation value to 67.5°. The base station transmits the signal to which the phase compensation value is applied to the corresponding terminal and receives the response signal from the terminal. According to an embodiment of the present invention, it is determined that the reception status is better when the second phase interval compensation value is applied.

Based on the determination result in part (c) of FIG. 6, the first phase interval corresponds to the range of 45° to 67.5° and the second phase interval to the range of 67.5° to 90° as shown in part (d) of FIG. 6. The phase calculator 130 sets the first phase interval compensation value to 56.25° and the second phase interval compensation value to 78.75°. The base station transmits the signal to which the phase compensation value is applied to the corresponding terminal and receives the response signal from the terminal. According to an embodiment of the present invention, it is determined that the reception status is better when the first phase interval compensation value is applied.

As described above, the optimal phase compensation value can be found by determining the phase compensation value inductively. Although the description has been made with specific values, those values are not absolute but relative values.

As described above, the signal transmission method and apparatus of a multi-antenna base station according to the present invention compensates the phase of the signal transmitted by at least one of multiple antennas based on the reception status information reported by the terminal such that the base station is capable of performing coherent combining of the transmit signals without extra transmit signal phase mapping circuit, resulting in expansion of the base station coverage.

Although certain embodiments of the invention have been described using specific terms, devices, and methods, such description is for illustrative purposes only. The words used are for description rather than limitation. It is to be understood that changes and variations may be made by those of ordinary skill in the art without departing from the spirit or the scope of the present invention, which is set forth in the following claims.

What is claimed is:

1. A signal transmission method of a base station including multiple antennas, the method comprising:
  transmitting, to at least one terminal, a first signal using the multiple antennas based on a first compensation phase selected in a first phase interval;
  receiving, from the at least one terminal, first signal reception status information related to the first signal, the first signal reception status information including information related to a bit error rate of the first signal;
  transmitting, to the at least one terminal, a second signal based on a second compensation phase selected in a second phase interval using the multiple antennas,
  receiving, from the at least one terminal, second signal reception status information related to the second signal; and
  determining a third compensation phase to transmit a third signal based on the first signal reception status information and the second signal reception status information,
  wherein the first phase interval and the second phase interval do not overlap each other,
  wherein the third compensation phase is selected from a third phase interval, and
  wherein the third phase interval is subdivided from one of the first phase interval and the second phase interval selected.

2. The method of claim 1, wherein the determining a third compensation phase comprises:
  comparing the first signal reception status information and the second signal reception status information;
  determining the third phase interval between the first phase interval and the second phase interval for better signal reception status information; and
  selecting the third compensation phase in the determined third phase interval.

3. The method of claim 1, wherein the second phase compensation value is obtained by adding a predetermined value to the first compensation phase.

4. The method of claim 1, wherein the first signal and the second signal are transmitted on a common control channel, and the first signal reception status information and the second signal reception status information include at least one of a signal level and a signal quality.

5. The method of claim 1, wherein the first signal and the second signal are transmitted on a user-dedicated channel, and the first signal reception status information and the second signal reception status information include at least one of a mean bit error and a variation coefficient of bit error.

6. The method of claim 4, wherein the second phase compensation is calculated as a value maximizing a sum of signal levels or signal qualities of at least one terminal.

7. A base station apparatus comprising:
a transceiver including multiple antennas for transmitting a signal to at least one terminal; and
a controller configured to
transmit, to at least one terminal, a first signal using the multiple antennas based on a first compensation phase selected in a first phase interval,
receive, from the at least one terminal, first signal reception status information related to the first signal, the first signal reception status information including information related to a bit error rate of the first signal,
transmit, to the at least one terminal, a second signal based on a second compensation phase selected in a second phase interval using the multiple antennas,
receive, from the at least one terminal, second signal reception status information related to the second signal, and
determine a third compensation phase to transmit a third signal based on the first signal reception status information and the second signal reception status information,
wherein the first phase interval and the second phase interval do not overlap each other,
wherein the third compensation phase is selected from a third phase interval, and
wherein the third phase interval is subdivided from one of the first phase interval and the second phase interval selected.

8. The base station of claim 7, wherein the controller is configured to determine the second phase compensation for improving the signal reception status based on the first signal reception status information.

9. The base station of claim 7, wherein the controller is configured to transmit the first signal and the second signal on a user-dedicated channel, and the first signal reception status information and the second signal reception status include at least one of a mean bit error and a variation coefficient of bit error.

10. The base station of claim 8, wherein the controller is configured to transmit the first signal and the second signal on a common control channel, and the first signal reception status information and the second signal reception status information include at least one of a signal level and signal quality.

11. The base station of claim 10, wherein the controller is configured to calculate the second phase compensation value for maximizing a sum of the signal levels or signal qualities of the at least one terminal.

\* \* \* \* \*